Oct. 24, 1939.                E. H. LOCKWOOD                2,177,282
                                COOKING PLATE
                             Filed Jan. 4, 1938              2 Sheets—Sheet 1
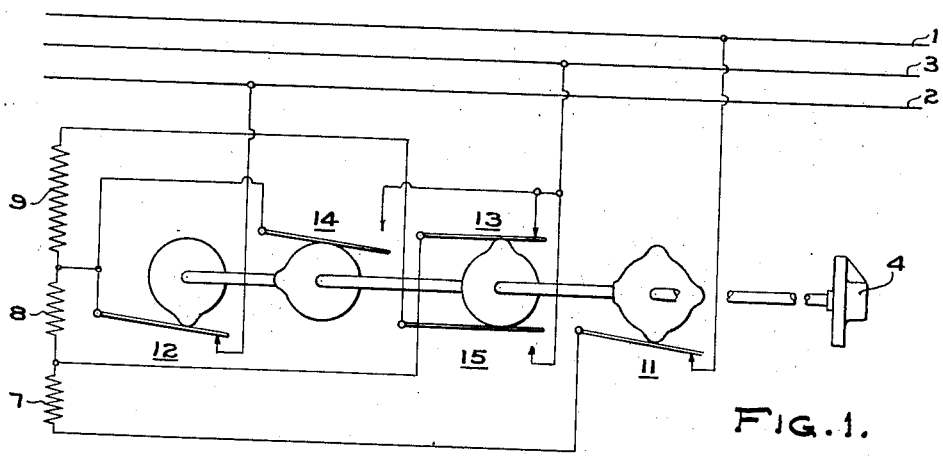
FIG. 1.
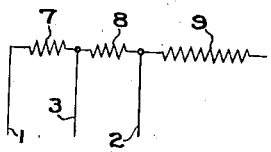    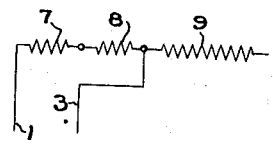    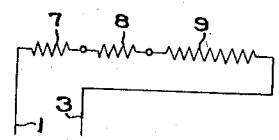
FIG. 4.          FIG. 5.          FIG. 6.
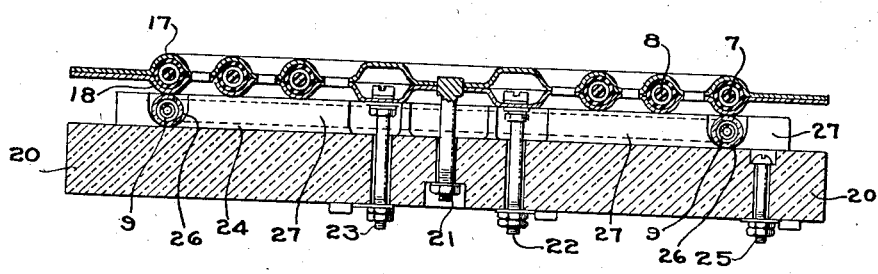
FIG. 2.
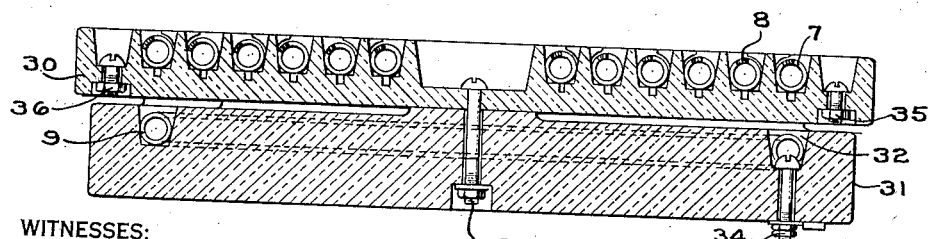
WITNESSES:                                              INVENTOR
                            FIG. 3.          EDWIN H. LOCKWOOD.
                                              BY
                                                W. R. Coley
                                                 ATTORNEY Oct. 24, 1939.　　　　E. H. LOCKWOOD　　　　2,177,282
COOKING PLATE
Filed Jan. 4, 1938　　　　2 Sheets-Sheet 2

WITNESSES:

INVENTOR
EDWIN H. LOCKWOOD.
BY
ATTORNEY

Patented Oct. 24, 1939

2,177,282

UNITED STATES PATENT OFFICE 2,177,282

COOKING PLATE

Edwin H. Lockwood, Mansfield, Ohio, assignor to Westinghouse Electric & Manufacturing Company, East Pittsburgh, Pa., a corporation of Pennsylvania Application January 4, 1938, Serial No. 183,362

9 Claims. (Cl. 219—20)

This application is, in part, a continuation of subject-matter divided from my application, Serial No. 57,549, filed January 4, 1936, and entitled "Cooking plates".

This invention relates to cooking plates of the electrically heated type. Heretofore, such plates have been provided with adjustments for several degrees of heat, the lowest degree giving about one-quarter as much heat as the highest one.

It has been found that for cooking operations in which the food is to simmer, the rate at which the heat is supplied even when the device is adjusted to the lowest degree is inconveniently large. This has given rise to a disadvantage of the electric plate over a gas plate. When a long simmering operation is desired, the food is apt to boil dry with the electric plate while the gas in a gas plate can be turned low enough to avoid boiling the water away. By simmer or simmer heat I mean, therefore, a heat of such intensity that while it may be capable of maintaining a mild boiling of water, it is of lesser intensity than the conventional or so-called, "low heat" which is capable of initiating or maintaining a violent boiling of water.

It is an object of this invention to provide an improved cooking plate that delivers heat at relatively high and low rates and without being uneconomical in the use of power.

It is a further object of this invention to provide a range as well as a single cooking plate therefor which will be capable of producing both a very high heat, that is, a heat as high as can be produced commercially as well as a relatively low or simmer heat.

It is a further object of this invention to provide a heating plate with a supplemental heating coil so located that while it will not interfere with effective delivery of heat from the ordinary heating coils to the food, it will, when energized, deliver its own heat to the food without any great loss.

It is a further object of this invention to provide connections whereby the heating coils may be connected in parallel, in series, or singly to a supply circuit, and in addition, a connection may be established whereby the heating coils may be connected in series with each other and in series with the supplemental coil across the supply circuit.

It is a further object of this invention to provide a supplemental coil in such a location that it delivers heat to the food as effectively as the main coils, and to provide means for connecting it in circuit with the main coils in such manner that they will deliver only enough heat to the food as will bring the total heat delivered thereto up to what the supplemented heat would deliver if it were located where the main coils are.

It is a further object of this invention to provide the supplemental coil and its insulation without materially increasing the initial heat absorbed by the plate as a whole so that the promptness with which the plate can heat up shall not be diminished by the additional coil.

Other objects of the invention and details of the construction will be apparent from the following description and the accompanying drawings, in which:

Fig. 1 is a circuit diagram illustrating the changeable connections;

Fig. 2 is a section through one type of heating plate embodying this invention;

Fig. 3 is a section through another type of heating plate embodying this invention;

Figs. 4, 5 and 6 show, respectively, the circuit connections for producing the highest cooking heat, the intermediate cooking heat and the simmer heat;

Figure 7:
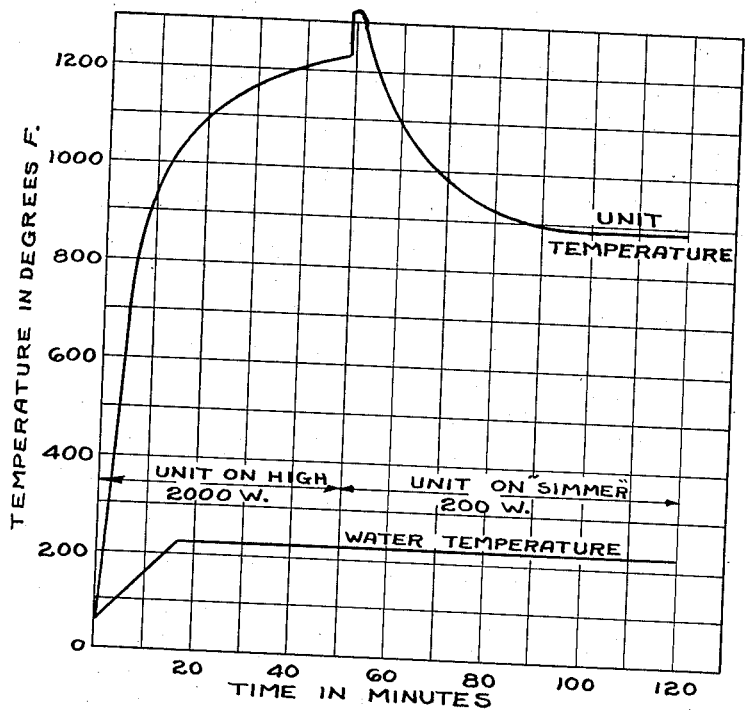
Fig. 7 is a graph showing the performance of one embodiment of the cooking plate constructed in accordance with my invention.

In Fig. 1 of the drawings an ordinary three-wire supply circuit is illustrated, the wires 1 and 2 being the mains and 3 being the neutral wire. The rotatable switch handle or button 4 operates a rotatable multi-plate switch for changing the connections between the supply circuit and the coils 7, 8 and 9. It will be understood that any other suitable type of switch may be employed. In the illustrated position, the switch handle 4 has caused the switches 11 and 12 to be closed, thus connecting the coils 7 and 8 in series between the mains 1 and 2. There is also a neutral connection established by the switch 13 between the junction-point of coils 7 and 8 and the neutral wire 3. This connection of the coils 7 and 8 is shown in Fig. 4.

The several connections are effected in the structure illustrated by cams operating upon switch blades and controlled by the handle 4. With a quarter-turn clockwise from the position illustrated, the connection will be from the main 1 through coils 7 and 8 in series over the switch 14 to the neutral wire 3 (see Fig. 5). With a half-turn clockwise from the position illustrated, the connection will be from the wire 1 through coils 7, 8 and 9 in series over the switch 15 to the neutral wire 3 as shown in Fig. 6. With a three-quarters turn clockwise from the position illustrated, all of switches will be opened and no power will be delivered. I have, therefore, illustrated a set of connections by which coils 7 and 8 may be connected to power either between each main wire and the neutral, or in series between one main wire and the neutral, or in series between one main wire and the third coil 9 which is in series with them and connected to the neutral.

If it is desired to use the device with a two-wire system instead of the three-wire system illustrated, switches 11 and 12 may be connected to the same main, and the switches shown connected to the neutral wire 3 may be connected to the opposite main. No other changes are needed.

Regardless of number of wires in the electrical system defining the power source, it will be apparent that the coils are energized at a single potential, such as, for example, 115 volts. When a three-wire system constitutes the power source, the lowest available voltage is employed for energizing the coils at all times. This is desirable, as a coil designed for operation at a relatively high potential on high heat and a lower potential on lower heat must necessarily be of relatively high resistance and, therefore, more fragile than a low voltage, low-resistance coil.

In the construction shown in Fig. 2, the main coils 7 and 8 are wound in the familiar way to form two flat spirals, each made of a coil of wire inside a metal sheath and separated from the sheath by a body of insulation. The metal sheath is illustrated as made of two portions 17 and 18 forming two closed spirals in each of which an insulated coil is located. The plate formed by the sheath and the coils is attached to a refractory base 20 by means of a central bolt 21. The terminals of the coils 7 and 8 are brought to the underside of the refractory 20. The inner terminals are illustrated at 22 and 23, the outer terminals, being remote from the plane of the section, are not illustrated.

The coil 9 comprises one circular turn of coiled wire surrounded by sheath 24. The sheath is made of a succession of tubular pipes or tubes 26 of porcelain or other refractory material, on which metal sheath 17, 18 rests. These pipes 26 are positioned in recesses in radial ribs 27, integral with the upper face of refractory 20. The terminals of this coil are brought to the underside of the refractory 20 in any convenient manner, as for example by the bolts 25.

In the form illustrated in Fig. 3, an upper disc 30 of refractory is provided with two open grooves which form flat spirals in a familiar way. In these grooves the coils 7 and 8 are located. A refractory 31 corresponding to the refractory 20 in Fig. 2 is provided with an annular groove 32, in which the coil 9 is arranged. A central bolt 33 connects the refractories 30 and 31 together. A terminal for the coil 9 is illustrated at 34 and two terminals for the two flat spiral coils 7 and 8 are illustrated at 35 and 36, but if desired, these bolts may extend to the lower side of the refractory 31.

The operation of the device with either the plate illustrated in Fig. 2 or Fig. 3 is the same. The coils are connected, as illustrated in Fig. 1, and if the switch 4 be turned to the illustrated position, the coils 7 and 8 will be heated. They are connected by switches 11 and 12 across the power mains, as previously described. The cooking plate in either form has a substantially flat upper surface on which the cooking vessel may be placed. The coils 7 and 8 are near said surface and the heat will be delivered from the coils to the vessel with very little loss. Because the vessel will not set absolutely flat upon the plate, there will be some loss by poor contact between them. There will also be some loss by radiation either through the crevices between the cooking vessel and the plate or by radiation directly through the cooking vessel and its contents into the room.

When the switch is turned a quarter turn clockwise from the position of Fig. 1, the two coils 7 and 8 are connected in series across a potential equal to that across which each coil was connected before, as previously described. The heat limit is, therefore, one quarter of that delivered in the position of Fig. 1. When the handle is given another quarter turn counter-clockwise, the auxiliary coil 9, which is of materially greater resistance than the other coils, is connected in series with them. The amount of heat delivered is substantially smaller than in any of the two previously described positions, being approximately equal to one tenth of the heat delivered in the highest heat position as will be more fully described hereafter.

In accordance with the foregoing, it will be apparent that all coils in the sheaths 17 and 18 are energized, equally, on all heats referred to. Accordingly, heat is imparted uniformly over the entire surface of the sheaths regardless of the setting of the control switch.

The heat delivered in the simmering position need not bear this relation to the greatest heat. It may be made larger, if desired, by making the resistance of coil 9 smaller and it may be made smaller by making the resistance of coil 9 larger. Coil 9 being further from the working surface than coils 7 and 8 is rather more ineffective in delivering heat to a cooking vessel resting on said surface. When coil 9 is connected into the circuit, it is in series with coils 7 and 8. One advantageous design for the construction is to so select the resistance of coil 9 relative to coils 7 and 8 that the heat delivered by the latter shall just compensate for the spaced position of the former. Thus, the cooking vessel on the working surface will receive the same heat as if the coil 9 were located at that surface and were working alone. With this design, the simmering coil 9 delivers about sixty percent of the heat.

If the cooking vessel contains material which ought to simmer, the handle 4, being in the last described position, will properly provide for the cooking of such an article.

When the current is first turned on, full power may be used for a few moments and then the handle turned to the simmering position. The plate will thus be brought quickly to a simmering temperature. In order that this may be accomplished without waste of time or passage of heavy current, the cooking plate should have the smallest heat-absorbing capacity which can be readily obtained. To keep the capacity small, in Fig. 2, the metal sheath is of stainless steel as thin as practical and separated from the conductor by magnesium oxide. In Fig. 3 the refractory 30 is made as light as is consistent with the necessary mechanical strength. The refractory 20 or 31 is made of some material having small specific heat and is porous to afford good thermal insulation. It is as thin as it can be and still afford sufficient insulation. Glazed brick is a suitable material for this purpose. The combined overall thickness of the plate shown is preferably of the normal order of thickness of cooking plates in electric ranges.

Referring now to Fig. 7, this shows the results of a test which I have conducted with an electric range embodying one of my cooking plates. Respecting this figure, an aluminum pan containing three quarts of water was placed upon the cooking plate, the water being at approximately 60° F. To initiate heating, the handle 4 was adjusted to the high heat position, providing a circuit as shown in Fig. 4. It will be noted from the graph that the water rose rapidly to boiling temperature and that the temperature of the unit itself became in excess of 1200° F. At such time or any time thereafter, the operator may adjust the handle 4 to the simmer heat position, thus utilizing the circuit shown in Fig. 6. In the present instance, the simmer heat was turned on after 50 minutes of heating and, from inspection of Fig. 7, it will be noted that the simmer heat was adequate for maintaining the water at or near boiling temperature. Usually, in such processes, the high heat effects rapid boiling of the water, which rapid boiling effect is replaced with a mild boiling effect, once the simmer heat has been applied. It will also be noted that, in the foregoing test, the temperature of the unit itself dropped from something in excess of 1200° F. to approximately 900° F., the latter temperature being maintained substantially by the simmer adjustment.

As is well known in the art, cooking plates of 8 inch and 6 inch diameters are generally used. With an 8 inch cooking plate, I may, for example, provide 2000 watts for the high heat position, 1000 watts for the intermediate position, and 200 watts for the simmer position. With a 6 inch cooking plate, I prefer to employ 1200 watts for the high heat position, 600 watts for the intermediate position, and 120 watts for the simmer position. Respecting the foregoing, it will be noted that the wattage density for both sizes of cooking plates, that is, the number of watts per sq. in. of area of the cooking surface, is approximately 35 watts per square inch for the high heat position, and approximately 3.5 watts per square inch for the simmer position. In calculating the area of the cooking plate, I have employed the area projected by the perimeter of the heating surface, this area not including the additional surface involved by the undulations or depressions formed between adjacent turns of the coil as shown in Fig. 2.

Figure 8:
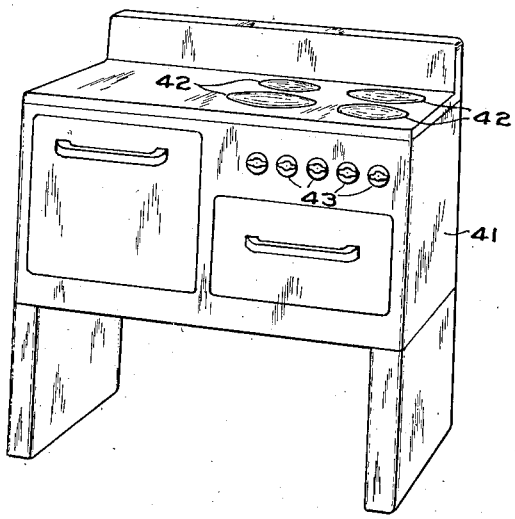
Fig. 8 shows an electric range of the type to which my invention is applied.

Referring now to Fig. 8, I show an electric cooking range 41 provided with four cooking plates 42 constructed in accordance with my invention. The cooking plates 42 are controlled, respectively, by switches 43 in the manner heretofore described.

Fig. 1 is illustrative only. Many other switches can accomplish the changes desired as easily as that illustrated. The switch is diagrammatically represented and the mechanical features by which the connections are established in no part of this invention, nor do I restrict myself to the particular mechanical structure shown, nor to the specific circuit shown.

Various further modifications and details will, of course, be aware to those skilled in the art and the specific description and illustration of only two forms of the device is not to be regarded as a limitation. The only intentional limitations are those expressed in the appended claims.

I claim as my invention:

1. In combination, an electric cooking plate having heating coils comprising two sections, said cooking plate also having a heating coil supplemental to said sections, a three-wire supply system comprising two main lines and a neutral line, and a single multi-position switch for selectively connecting said two sections of the heating coils across the main line voltage with the neutral line connected intermediate the sections, connecting said two sections across a main line and the neutral, and connecting said two sections and said supplemental heating coil in series across one main line and the neutral line.

2. In combination, an electric cooking plate having a cooking surface, heating coils adjacent said surface, insulation separating said coils from each other and from the part of the plate more remote from said cooking surface than said coils, a supplemental heating coil in said more remote part, insulation individual to said supplemental coil, and means for energizing the heating coils adjacent the cooking surface so that either full voltage drop is effective across each of said coils or so that substantially half full voltage drop is effective across each of said coils, said energizing means being effective to energize the heating coils in series and in series with the supplemental heater coil.

3. In a switch for establishing selected connections of a three-unit resistor or the like with three line wires, the combination of a plurality of contact makers, means on one of said makers for connecting one of said line wires with one terminal of said resistor in each heating position of the switch, means on one of the other makers for connecting an intermediate portion of the resistor to a second line wire in a high heat position of the switch, and for connecting the other terminal of the resistor to the second line wire in a low heat position of the switch, and means on others of said contact makers for connecting a third line wire to a second intermediate portion of the resistor in said high heat position of the switch and for connecting said second line wire to said second intermediate portion of the resistor in an intermediate heat position of the switch.

4. In a switch for establishing selected connections of a three-unit resistor or the like with two outside line wires and a neutral wire, the combination of a plurality of contact makers, means on one of said makers for connecting one of said outside line wires with the resistor in each working position of the switch, means on one of the other makers for selectively connecting either an intermediate portion or a terminal of said resistor to said neutral wire in one and in another of said working positions, respectively, and means on others of said makers for respectively connecting the second outside line wire or said neutral wire to another intermediate portion of said resistor in said one position and in still another position.

5. In combination, three resistance elements and a single rotary snap switch having first, second and third current supply terminals and adapted to connect two of said elements across first and second terminals in one position, to connect two of the elements across first and third terminals with the second terminal connected intermediate the elements in a second position and to connect all three elements in series across a pair of the terminals in another position.

6. In combination, three resistance elements and a single rotary snap switch having first, second and third current supply terminals, said first terminal being a common terminal and said second and third terminals having an intermediate and a high voltage applied thereto, respectively, said switch being adapted to connect two of said elements in series across said common terminal and the second terminal in one position, to connect two of the elements in series across the common terminal and the third terminal with the second terminal connected intermediate the elements in a second position and to connect all three elements across the common terminal and the intermediate voltage terminal in a third position.

7. In a surface cooking plate for an electric range, said cooking plate having a top cooking surface, the combination of a first and second resistance element located adjacent a substantial portion of the cooking surface of the cooking plate, another resistance element, and a unitary switch structure for controlling energization of said resistance elements and having three current supply terminals, one of which is a neutral terminal, said switch being adapted to connect said first and second elements across the neutral terminal and one of the other terminals in one position, to connect the first and second elements across two of the terminals with the neutral connected intermediate thereof in another position and to connect the first and second elements and said other resistance element across two of the terminals in another position whereby different degrees of heating are obtained and in all of which uniform distribution of heat over the cooking surface of the cooking unit is obtained for any degree of heating.

8. A cooking plate as claimed in claim 7 wherein the resistance elements located adjacent the cooking surface of the cooking plate having substantially the same resistances.

9. In a cooking plate for an electric range having a cooking surface, the combination of an element having a plurality of sections each disposed for imparting heat uniformly to the cooking surface during all periods of energization of the element, another element disposed for imparting heat uniformly to the cooking surface when energized, a switch movable to a plurality of positions for varying the intensity of energization of said first-mentioned element, all sections of which are energized equally respecting each other in all positions of the switch, said switch being movable to a position wherein both of said elements are energized to uniformly impart heat to the cooking surface at a relatively low rate.

EDWIN H. LOCKWOOD.